US009780872B2

(12) United States Patent
Ren et al.

(10) Patent No.: US 9,780,872 B2
(45) Date of Patent: Oct. 3, 2017

(54) ADAPTIVE OPTICS BASED SIMULTANEOUS TURBULENCE COMPENSATION OF MULTIPLE ORBITAL ANGULAR MOMENTUM BEAMS

(71) Applicants: Yongxiong Ren, Los Angeles, CA (US); Guodong Xie, Los Angeles, CA (US); Hao Huang, Los Angeles, CA (US); Alan E. Willner, Los Angeles, CA (US)

(72) Inventors: Yongxiong Ren, Los Angeles, CA (US); Guodong Xie, Los Angeles, CA (US); Hao Huang, Los Angeles, CA (US); Alan E. Willner, Los Angeles, CA (US)

(73) Assignee: University of Southern California, Los Angeles, CA (US)

(*) Notice: Subject to any disclaimer, the term of this patent is extended or adjusted under 35 U.S.C. 154(b) by 86 days.

(21) Appl. No.: 14/807,793

(22) Filed: Jul. 23, 2015

(65) Prior Publication Data

US 2016/0028479 A1     Jan. 28, 2016

Related U.S. Application Data

(60) Provisional application No. 62/028,273, filed on Jul. 23, 2014.

(51) Int. Cl.
*H04J 14/00*    (2006.01)
*H04B 10/112*   (2013.01)

(52) U.S. Cl.
CPC ..... *H04B 10/1123* (2013.01); *H04B 10/1121* (2013.01)

(58) Field of Classification Search
CPC .......................... H04B 10/1123; H04B 10/1121
USPC ............................................................ 398/43
See application file for complete search history.

(56) References Cited

U.S. PATENT DOCUMENTS 6,005,697 A * 12/1999 Wu ........................ G02B 6/272
                                                           398/1
2015/0288476 A1* 10/2015 Ashrafi ................. H04L 27/362
                                                          398/79

OTHER PUBLICATIONS

Tur, "Simultaneous Turbulence Compensation of Multiple Orbital-Angular-Momentum 100-Gbit/s Data Channels using a Gaussian Probe Beam for Wavefront Sensing", Optical Communication (ECOC 2013), 39th European Conference and Exhibition, Sep. 22-26, 2013.*
Dolinar, "Adaptive optics compensation of multiple orbital angular momentum beams propagating through emulated atmospheric turbulence", Optics Letters, vol. 39, No. 10, May 15, 2014, pp. 2845-2848).*

(Continued)

*Primary Examiner* — Juan A Torres
(74) *Attorney, Agent, or Firm* — Fish & Richardson P.C.

(57) ABSTRACT

An adaptive optics compensation approach for an OAM multiplexed FSO communication system is described, in which a Gaussian beam is used to probe the turbulence-induced wavefront distortions and derive the correction pattern for compensating the OAM beams. Using this approach, we demonstrate simultaneous compensation of multiple OAM beams each carrying a 100-Gbit/s data channel through emulated atmospheric turbulence. The results indicate that the turbulence-induced crosstalk and power penalty could be efficiently mitigated by ~12.5 dB and ~11 dB respectively.

20 Claims, 9 Drawing Sheets

(56) References Cited

OTHER PUBLICATIONS

Ren, "Simultaneous Pre-and Post-Turbulence Compensation of Multiple Orbital-Angular-Momentum 100-Gbit/s Data Channels in a Bidirectional Link Using a Single Adaptive-Optics System Frontiers in Optics 2013" Orlando, Florida United States Oct. 6-10, 2013 ISBN: 978-1-55752-988-6.*
Allen et al., "Orbital angular momentum of light and the transformation of Laguerre-Gaussian laser modes", Physical Review A, vol. 45, No. 11, Jun. 1, 1992, pp. 8185-8189.
Anguita et al., "Turbulence-induced channel crosstalk in an orbital angular momentum-multiplexed free-space optical link", Applied Optics, vol. 47, No. 13, May 1, 2008, pp. 2414-2429.
Baker et al., "Breadboard testing of a phase-conjugate engine with an interferometric wave-front sensor and a microelectromechanical systems-based spatial light modulator", Applied Optics, vol. 43, No. 30, Oct. 20, 2004, pp. 5585-5593.
Chandrasekaran et al., "Photon Information Efficient Communication Through Atmospheric Turbulence—Part I: Channel Model and Propagation Statistics", Journal of Lightwave Technology, vol. 32, No. 6, Mar. 15, 2014, pp. 1075-1087.
Murphy et al., "Experimental detection of optical vortices with a Shack-Hartmann wavefront sensor", Optical Society of America, Optics Express, vol. 18, No. 15, Jul. 19, 2010, pp. 15448-15460.
Paterson, "Atmospheric Turbulence and Orbital Angular Momentum of Single Photons for Optical Communication", Physical Review Letters 94, 153901 (1-4), 2005.
Ren et al., "Simultaneous Turbulence Compensation of Multiple Orbital-Angular-Momentum 100-Gbit/s Data Channels using a Gaussian Probe Beam for Wavefront Sensing", Optical Communication (ECOC 2013), 39th European Conference and Exhibition, Sep. 22-26, 2013.
Ren et al., "Atmospheric turbulence effects on the performance of a free space optical link employing orbital angular momentum multiplexing", Optics Letters, vol. 38, No. 20, Oct. 15, 2013, pp. 4062-4065.
Ren et al., "Adaptive optics compensation of multiple orbital angular momentum beams propagating through emulated atmospheric turbulence", Optics Letters, vol. 39, No. 10, May 15, 2014, pp. 2845-2848.
Rodenburg et al., "Influence of atmospheric turbulence on states of light carrying orbital angular momentum", Optics Letters, vol. 37, No. 17, Sep. 1, 2012, pp. 3735-3737.
Wang et al., "Terabit free-space data transmission employing orbital angular momentum multiplexing", Nature Photonics, vol. 6, Jul. 2012, pp. 488-496.
Ahmed et al., "Reconfigurable 2×2 Orbital angular momentum based on optical switching of 50-Gbaud QPSK channels", Optics Express, vol. 22, No. 1, Jan. 13, 2014, pp. 756-761.
Bozinovic et al., "Terabit-Scale Orbital Angular Momentum Mode Division Multiplexing in Fibers", Science, vol. 240, Jun. 28, 2013, pp. 1545-1548.
Huang et al., "Orbital-Angular-Momentum-Based Recongifurable and "Lossless" Optical Add/Drop Multiplexing of Multiple 100-Gbit/s Channels", Optical Society of America, OFC/NFOEC Technical Digest, 2013, 3 pages.
Huang et al., "Liquid-crystal-on-silicon-based optical add/drop multiplexer for orbital-angular-momentum-multiplexed optical links", Optics Letters, vol. 38, No. 23, Dec. 1, 2013, pp. 5142-5145.
Yue et al., "Reconfigurable Oribtal-Angular-Momentum-Based Switching among Multiple 100-Gbit/s Data Channels", Optics Society of America, OFC/NFOEC Technical Digest, 2013, 3 pages.
Willner et al., "Reconfigurable Orbital-Angular-Momentum Manipulation and Switching of Polarization-Multiplexed 100-Gbit/s QPSK Data Channels," IEEE Photonics Conference, Sep. 8-12, 2013, 2 pages.

* cited by examiner

ADAPTIVE OPTICS BASED SIMULTANEOUS TURBULENCE COMPENSATION OF MULTIPLE ORBITAL ANGULAR MOMENTUM BEAMS

CROSS-REFERENCE TO RELATED APPLICATIONS

This application claims the benefit under 35 U.S.C. §119 (e) of U.S. patent application Ser. No. 62/028,273, entitled "Adaptive Optics Based Simultaneous Turbulence Compensation of Multiple Orbital Angular Momentum Beams," filed Jul. 23, 2014, which is incorporated herein by reference in its entirety.

STATEMENT AS TO FEDERALLY SPONSORED RESEARCH

This invention was made with government support under Grant No. 142305 awarded by Defense Advanced Research Projects Agency (DARPA). The government has certain rights in the invention.

BACKGROUND

This disclosure relates to optical communication systems.

The multiplexing of multiple orthogonal orbital-angular-momentum (OAM) beams has emerged as a possible approach for increasing system capacity and spectral efficiency (SE) in free-space optical (FSO) links (see G. Gibson et. al., OE 12, 5448 (2004) and J. Wang et. al, NP 6, 488, (2012)). Light beams carrying OAM have a variable phase wavefront of the form of $\exp(i\,l\,\phi)$ ($l=0, \pm 1, \pm 2, \ldots$), in which $\phi$ refers to the azimuth angle and $l$ determines the OAM value (see L. Allen et. al, PRA 45, 8185 (1992)). One major advantage of OAM is that the OAM modes with helical phase front and "doughnut" intensity shape are intrinsically orthogonal to one another, which indicates that in principle, efficient multiplexing and demultiplexing of multiple independent and spatially overlapping data-carrying OAM beams can be performed with negligible crosstalk (see L. Allen et. al, PRA 45, 8185 (1992) and A. M. Yao et. al., AOP 3, 161 (2011)).

Several reports have shown that OAM multiplexing can be used in free-space links to enhance data capacity and spectral efficiency, including a 2.56 Tbit/s data transmission link with an SE of 95.7 bit/s/Hz by multiplexing 32 OAM modes (see J. Wang et. al, NP 6, 488, (2012)). However, a critical limitation of transmitting OAM-based data channels is the significant performance degradation induced by atmospheric turbulence (see J. Anguita et. al, AO 47, 2414 (2008); G. Tyler et. al, OL 34, 142 (2009); and Y. Ren et. al, CLEO'13, CM2G.4 (2013)). As the orthogonality of multiple co-propagating OAM beams depends on their distinct helical phase-fronts, the refractive index inhomogeneities of the atmosphere will distort these phase-fronts, causing power spreading of each transmitted OAM mode onto neighboring modes, which will essentially result in inter-modal crosstalk between different OAM data channels. These turbulence-induced effects can severely limit the distance and number of OAM beams that can be accommodated in FSO links (see Y. Ren et. al, CLEO'13, CM2G.4 (2013); B. Rodenburg et. al, OL 37, 3735 (2012); and N. Chandrasekaran et. al, Proc. SPIE 8518, 851808 (2012)).

An important goal for the future use of OAM multiplexing in high-capacity FSO links is the ability to compensate the effects of atmospheric turbulence on the data channels, both in terms of degradation of a single data-carrying OAM beam as well as in the crosstalk increase induced by turbulence (see N. Chandrasekaran et. al, Proc. SPIE 8518, 851808 (2012)).

SUMMARY

The present disclosure includes systems and techniques relating to adaptive optics for turbulence compensation, such as compensating for turbulence effects on orbital angular momentum (OAM) beams transmitted over free space optical (FSO) links.

In an OAM multiplexing-based FSO communication system, OAM beams each carrying independent data streams, are multiplexed at the transmitter and demultiplexed at the receiver. However, the atmospheric turbulence poses challenges and can significantly degrade the performance of the OAM-based FSO communication systems. This paper describes an adaptive optics compensation scheme to simultaneously compensate multiple spatially-overlapping OAM beams propagating through the atmospheric turbulence. One or more of these techniques can potentially enable future use of high-capacity OAM-based FSO communication systems.

We describe adaptive optics compensation to simultaneously compensate multiple OAM beams propagating through atmospheric turbulence. A Gaussian beam ($l=0$) on one polarization is used to probe the turbulence-induced wavefront distortions and derive the correction pattern for compensating the OAM beams on the orthogonal polarization. By using this scheme, we demonstrate simultaneous compensation of multiple OAM beams each carrying a 100-Gbit/s data channel through emulated atmospheric turbulence. A rotatable phase screen plate obeying Kolmogorov spectrum statistics is used to emulate turbulence (see L. Andrews et. al, SPIE Press (2005)). The results show that the turbulence-induced crosstalk effects on neighboring modes are efficiently mitigated by ~12.5 dB, and the system power penalty is improved by ~11 dB after compensation.

According to at least one aspect, an OAM multiplexing-based FSO communication system includes: a transmitter configured and arranged to (i) multiplex OAM beams carrying independent data and (ii) transmit the OAM beams along with a Gaussian beam; a receiver configured and arranged to (i) collect the OAM beams and the Gaussian beam having propagated collinearly, (ii) demultiplex the OAM beams, and (iii) detect the demultiplexed beams and recover the independent data; where the receiver includes an adaptive optics compensator designed to use the Gaussian beam to probe turbulence distortions and derive data to compensate for turbulence effects on the OAM beams. Note that the data can be correction patterns that can be applied to simultaneously compensate for turbulence effects on the Gaussian beam and multiple OAM beams.

This and other aspects can include one or more of the following features. The adaptive optics compensator can be designed to obtain correction patterns using the Gaussian beam as a probe for wavefront distortion measurements, and use the correction patterns to simultaneously compensate for turbulence effects on multiple OAM beams. The adaptive optics compensator can include: a beam separator to separate the Gaussian beam from the OAM beams; a first wavefront corrector to process the separated OAM beams and output corrected OAM beams; a second wavefront corrector to process the separated Gaussian beam and generate a corrected Gaussian beam; a wavefront sensor to process the corrected Gaussian beam; and a feedback controller coupled with the wavefront sensor to provide feedback to the first wavefront corrector and the second wavefront corrector.

The adaptive optics compensator can include: a beam separator to separate the Gaussian beam from the OAM beams; a Shack-Hartmann wavefront sensor to measure wavefront distortions of the Gaussian beam; a feedback controller coupled with the Shack-Hartmann wavefront sensor to provide the correction patterns to two wavefront correctors; and the two wavefront correctors being loaded with the same correction patterns used to correct the OAM beams and the Gaussian beam, respectively. The beam separator can include a polarization beamsplitter. The beam separator can include a wavelength filter.

The OAM beams can encode the independent data using an on-off keying modulation format. The OAM beams can encode the independent data using a phase-shift keying (PSK) modulation format. The OAM beams can encode the independent data using a quadrature amplitude modulation format. The OAM beams can encode the independent data as 100-Gbit/s quadrature phase-shift keying (QPSK) signals. Note that QPSK is a special case of PSK.

According to at least another aspect, an OAM multiplexing-based FSO communication receiver includes: an input to receive an optical communication beam including (i) multiplexed OAM beams carrying independent data and (ii) a Gaussian probe beam; and an adaptive optics compensation system coupled with the input, the adaptive optics compensation system including (i) a beam separator to separate the Gaussian probe beam from the OAM beams, (ii) a first wavefront corrector to process the separated OAM beams and output corrected OAM beams based on correction patterns generated for the Gaussian probe beam, and (iii) a second wavefront corrector to process the separated Gaussian probe beam and generate a corrected Gaussian beam based on the correction patterns generated for the Gaussian probe beam.

This and other aspects can include one or more of the following features. The adaptive optics compensation system can include: a wavefront sensor to process the corrected Gaussian beam; and a feedback controller coupled with the wavefront sensor to provide feedback to the first wavefront corrector and the second wavefront corrector. The wavefront sensor can include a Shack-Hartmann wavefront sensor to measure wavefront distortions of the Gaussian probe beam. Further, the beam separator can include a polarization beamsplitter or a wavelength filter.

According to at least another aspect, a method includes: receiving an optical signal including OAM beams and a Gaussian beam, where each of the OAM beams carries an independent data stream; separating the Gaussian beam from the OAM beams; obtaining correction patterns using the Gaussian beam for wavefront distortion measurements; and simultaneously compensating for effects of atmospheric turbulence on the OAM beams and the Gaussian beam using the correction patterns.

This and other aspects can include one or more of the following features. The separating can include using a polarization beamsplitter to separate the Gaussian beam from the OAM beams, which are on different polarizations. The separating can include using a wavelength filter to separate the Gaussian beam from the OAM beams, which are on different wavelengths. The obtaining can include using a Shack-Hartmann wavefront sensor to measure wavefront distortions of the Gaussian beam. Finally, the compensating can include loading two wavefront correctors with the same correction patterns provided by a feedback controller coupled with a Shack-Hartmann wavefront sensor.

In some implementations, an OAM-based FSO communication system need not be limited to link distances of approximately 1 meter or less. The atmospheric turbulence effects need not be neglected, but rather can be compensated for. By compensating for turbulence effects, degradation of system performance can be reduced, and a practical FSO link can be used. Thus, the use of OAM-based FSO systems can be expanded. Moreover, two technical challenges can be overcome for turbulence compensation of OAM beams: (a) the conventional Shack-Hartmann wavefront sensing technique cannot be used for reconstructing the helical phasefront of the OAM beam, due to its phase singularities or branch points caused by turbulence (see K. Murphy et. al, OE 18, 15448 (2010)); and (b) the receiver's turbulence compensation system must correct multiple independent OAM beams simultaneously.

DETAILED DESCRIPTION

Angular momentum of a photon can be divided into spin angular momentum (SAM) and orbital angular momentum (OAM) in paraxial beams. SAM is associated with photon spin and manifested as circular polarization. OAM is linked to the spatial distribution of intensity and phase of a paraxial beam. Helically phased beams with an azimuthal phase term $\exp(il\phi)$ have an OAM of $1\hbar$. Here l is the topological charge, $\hbar$ is reduced Plank's constant, and $\phi$ is azimuthal angle. In this application, OAM modes with l>0 and l<0 are referred to as higher-order modes. The OAM mode with l=0 has a Gaussian intensity profile. In this application, the OAM mode with l=0 is referred to as a Gaussian mode or Gaussian beam. OAM modes with different topological charges are orthogonal.

OAM has recently seen applications in free-space information transfer and communication. In contrast to SAM, which has only two possible values, of $\pm\hbar$, the topological charge can take many values and therefore, in principle, provide a large range of possibly achievable OAM modes. OAM beams, composed of multiple OAM modes, have the potential to tremendously increase the capacity of communication systems.

Several reports have shown that OAM can be used in free-space links to enhance the data capacity and spectral efficiency, including a 2.56 Tbit/s data transmission link with a spectral efficiency of 95.7 bit/s/Hz by multiplexing 32 OAM modes. However, a critical limitation of transmitting OAM-based data channels is the significant performance degradation and crosstalk induced by atmospheric turbulence. This degradation can severely limit the distance and number of OAM beams that can be accommodated in free space optical (FSO) links.

An important goal for the future of using OAM in high-capacity multiplexed FSO links is the ability to compensate the effects of atmospheric turbulence on the data channels, both in terms of degradation of a single data-carrying OAM beam as well as in the crosstalk increase induced by turbulence. Several perplexing technical issues exist for compensation, including: (a) is it possible to reconstruct the twisting phase-front of the OAM beam, given the fact that the conventional Shack-Hartmann wavefront sensing technique could not detect the wavefront of OAM beam due to its phase singularities or branch points, (b) can a single correction pattern actually succeed in compensating multiple independent OAM beams simultaneously.

At least one embodiment of the invention demonstrates the simultaneous turbulence compensation of OAM-based 100-Gbit/s data channels using a Gaussian probe beam (l=0) for wavefront sensing. Rotatable phase screen plate obeying Kolmogorov spectrum statistics can be used to emulate turbulence. The experimental results show that the turbulence-induced crosstalk effects on neighboring modes are efficiently mitigated by ~12.5 dB and the system power penalty is improved by ~11 dB after compensation.

Figure 1A:
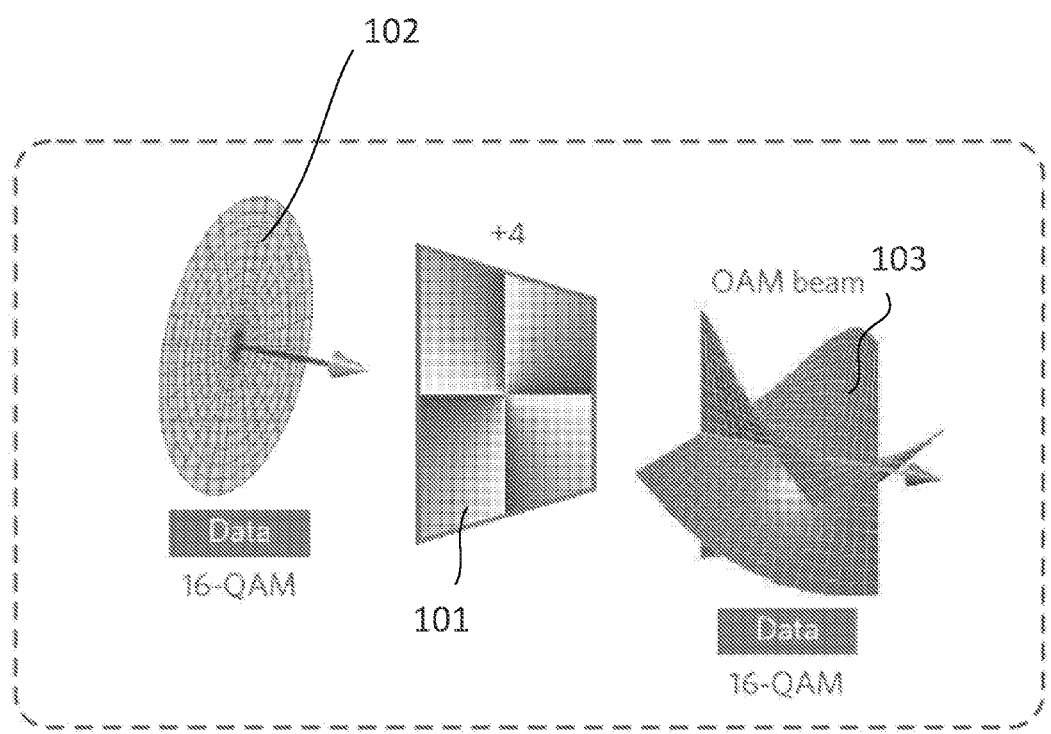
FIG. 1A illustrates the schematic representation of generation of an OAM beam with helical phase front from a beam with planer phase front.
Figure 1B:
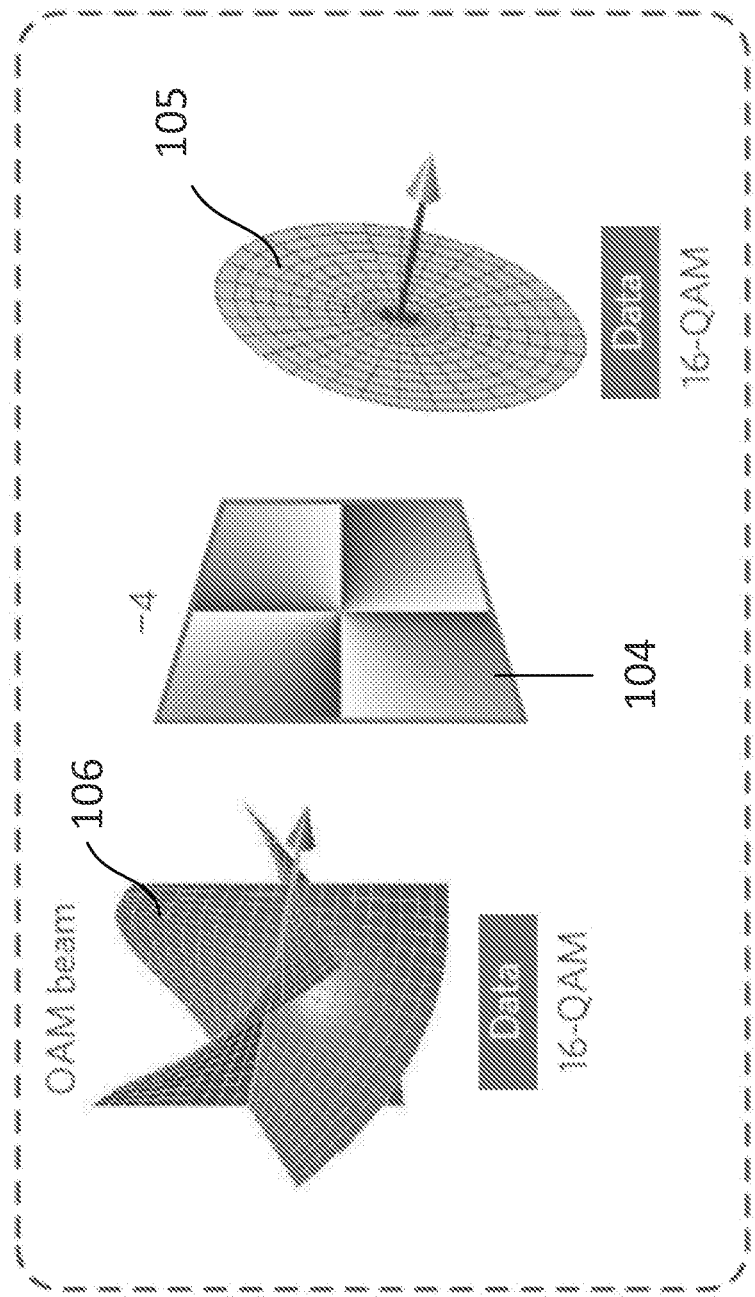
FIG. 1B illustrates the schematic representation of generation of a beam with planer phase front from an OAM beam with helical phase front.

FIGS. 1A and 1B present a schematic representation of the generation and back-conversion of an information-carrying OAM beam, where a light beam with OAM serves as a carrier of information, which emerges in a multilevel amplitude/phase modulation format (for example, 16-QAM). The phase and amplitude of a light beam (for example an OAM beam) can be modified using a Spatial Light Modulator (SLM). In this application, SLM has been broadly used to include Spiral phase mask, Spiral phase plate, Diffraction grating, Deformable mirror array or any other optical element that can modify the spatial amplitude and phase distribution of light that impinges on it. SLM can be both reflective and transmissive. In FIG. 1A, the SLM is a spiral phase mask 101 (with l=+4) that converts a planar phase front 102 into a helical one 103, resulting in the generation of an information-carrying OAM beam from an information-carrying Gaussian beam. Conversely, in FIG. 1B, an inverse spiral phase mask 104 (with l=−4) recovers an information-carrying beam with a planar phase front 105 from an information-carrying OAM beam with a helical phase front 106. Owing to their inherent orthogonality, OAM beams can be used to enable a variety of optical communication applications, such as multiplexing/demultiplexing of information-carrying OAM beams to achieve an increase in capacity and spectral efficiency, and data exchange between OAM beams for flexible data processing.

Figure 2:
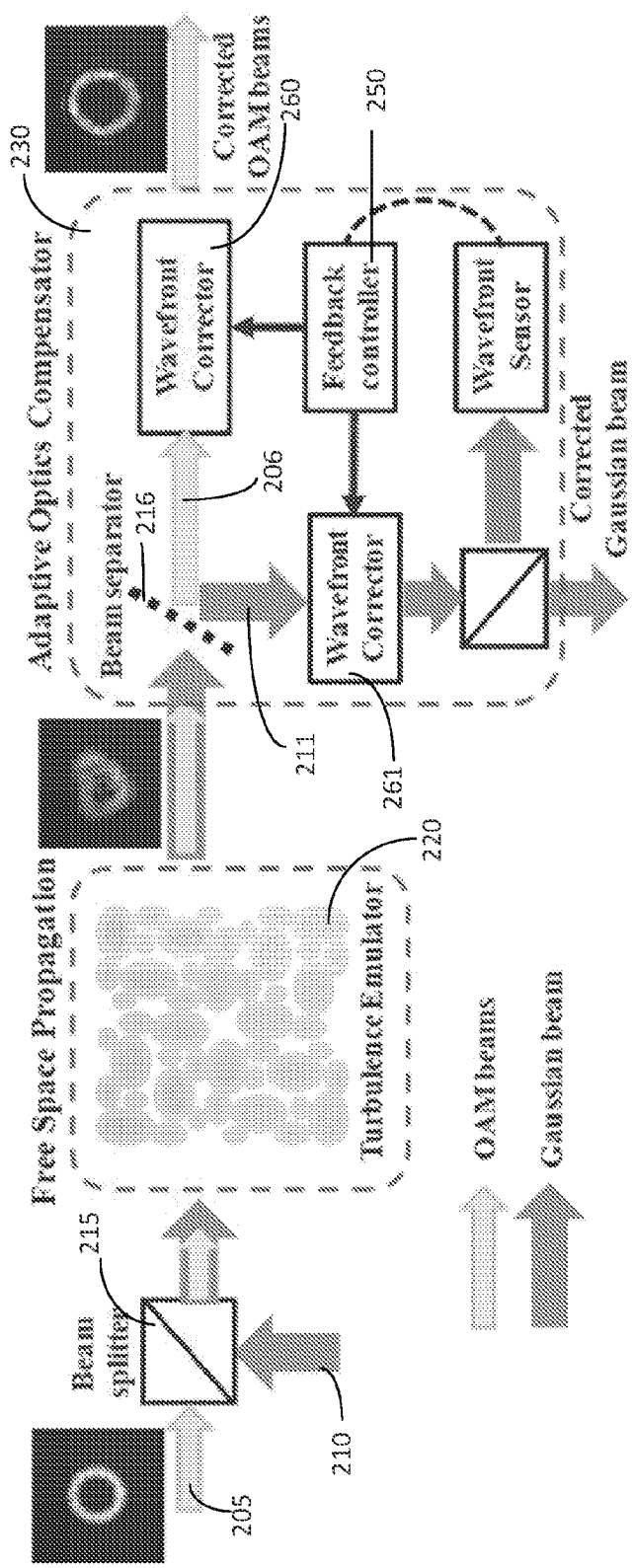
FIG. 2 shows schematics of turbulence compensation of multiple OAM beams using a Gaussian probe beam.

FIG. 2 shows schematics of turbulence compensation of multiple OAM beams using a Gaussian probe beam. Multiplexed OAM beams 205 (l≠0) having a given polarization are combined with an orthogonally-polarized Gaussian beam 210 (l=0) using a polarizing beam splitter (PBS) 215. The resulting beams propagate collinearly through atmospheric turbulence 220. At the receiver side, an adaptive optics (AO) compensation system 230 is built, in which the distorted Gaussian beam 211 is separated from the distorted OAM beams 206 using another PBS 216. The distorted Gaussian beam 211 serves as a probe for wavefront distortion estimations and required correction-pattern retrieval. A feedback controller 250 is used to update the two wavefront correctors 260 and 261 with the same correction pattern obtained to compensate the phase-front of Gaussian probe beam 211, as well as those of the distorted OAM beams 206.

Figure 3A:
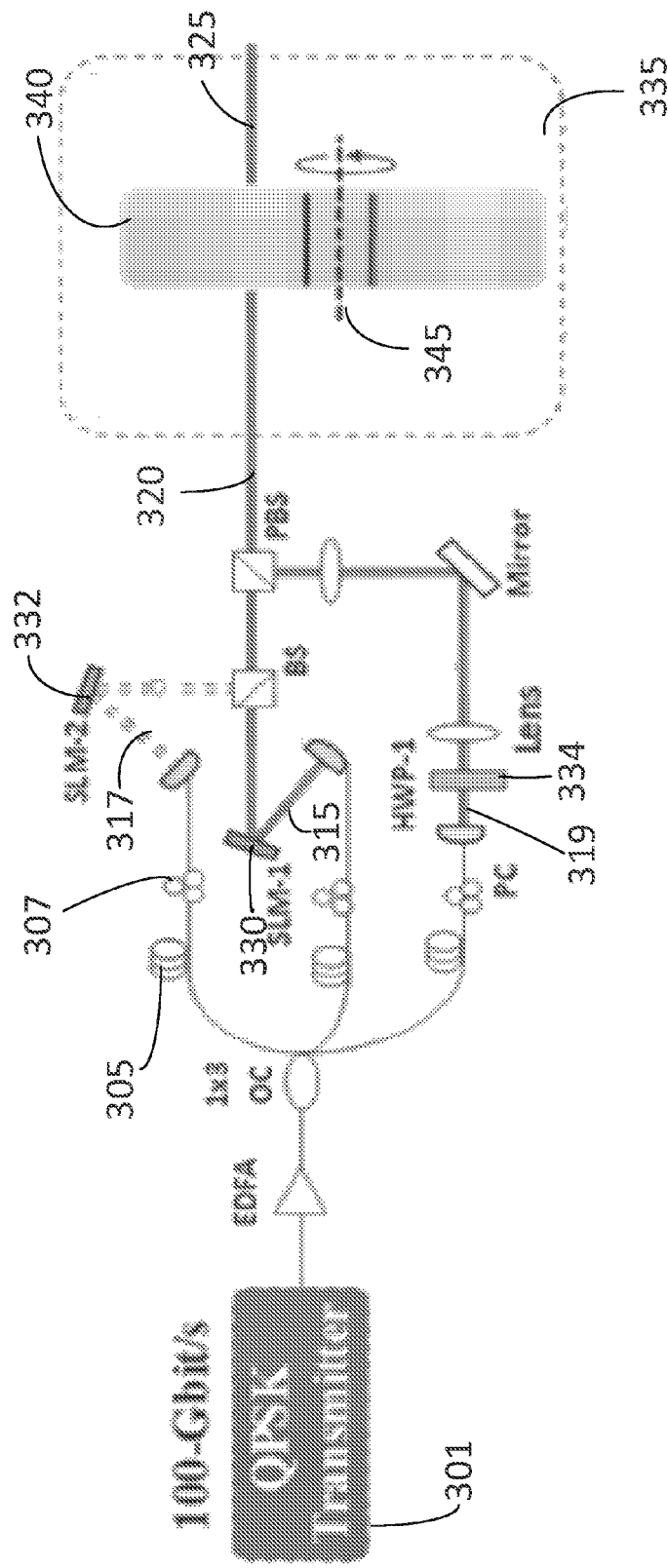
FIGS. 3A & 3B show an experimental setup of turbulence compensation of multiple OAM beams by using a Gaussian probe beam.
Figure 3B:
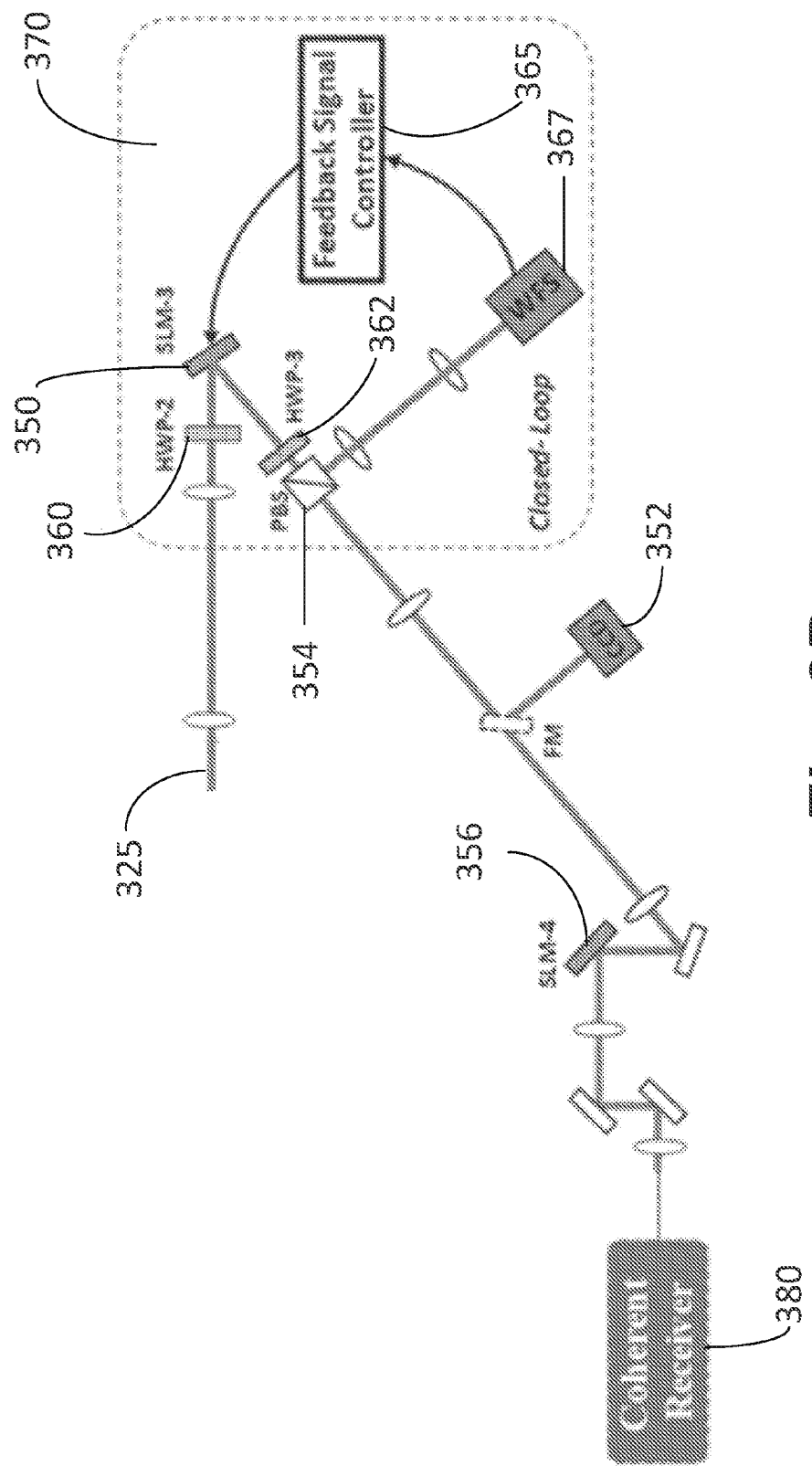

FIGS. 3A and 3B show an experimental setup of turbulence compensation of multiple OAM beams by using a Gaussian probe beam. In FIGS. 3A and 3B, BS refers to beam-splitter, FM refers to flip mirror, HWP refers to half wave plate, OC refers to optical coupler, EFA refers to Erbium Doped Fiber Amplifier, PC refers to polarization controller, SLM refers to spatial light modulator, and WFS refers to wavefront sensor. The 100-Gbit/s quadrature phase-shift keying (QPSK) signal generated by the QPSK transmitter 301 is split into three copies by OC 1×3, each of which is decorrelated using single-mode fibers (SMFs) 305 of different lengths. The three signal copies are sent to three collimators 307, each of which converts the output of the SMF to a collimated Gaussian beam with a beam diameter of 3 mm. One beam 315 is launched onto a reflective spatial light modulator (SLM-1) 330 loaded with a specific blazed-fork hologram or a helical phase hologram to create a higher-order OAM beam. Another beam 317 is converted into a superposition of two equally-weighted OAM beams (with OAM charges of l=3, 7) by loading SLM-2 332 with a specially designed phase hologram. The SLMs used here are polarization dependent liquid-crystal-based reflective phase modulators with a spatial resolution of 20 μm. Beam 317 is only turned on when investigating the impact of OAM crosstalk on the average bit-error-rate (BER) of the multiplexed OAM channels. The polarization of a third Gaussian beam 319 is rotated using a half-wave plate (HWP-1) 334 and then expanded using a 4-f lens system, consisting of two lenses, to become as wide as the widest OAM beam (i.e., l=9 in this experiment) along the propagation path. This beam 319 is then polarization multiplexed with beams 315 and 317 via a PBS. The resulting multiplexed beam 320 are sent through the atmospheric turbulence emulator 335. The effects of turbulence are emulated by a thin phase screen plate 340 that is mounted on a rotatable stage 345 and placed in the middle of the optical path. The phase screen plate with Fried's parameter r0=1 mm is used to emulate a 1 km turbulence channel (in accordance with L. Andrews et. al, SPIE Press (2005)). Although the turbulence is emulated using a phase screen plate, the method in this application can be applied to practical turbulent atmosphere.

In FIG. 3B, the beam 325 exiting from the turbulence emulator 335 (shown in FIG. 3A) is imaged onto the wavefront corrector, which is a spatial light modulator SLM-3 350, using a 4-f lens system. In this application, a spatial light modulator is used as wavefront corrector. In general, the wavefront corrector can be other wavefront shaping devices, including a deformable mirror. For simplification, only one wavefront corrector (which is a spatial light modulator 350 SLM-3) is used in the AO compensation system 370, which is shared when compensating the Gaussian beam and the OAM beams for one turbulence realization. As the SLM is polarization sensitive, HWP-2 360 is used to align the polarization of the Gaussian probe beam with the polarization orientation of SLM-3 350. The beam 325 after interacting with SLM-3 350 is also polarization adjusted by HWP-3 362 to ensure that the Gaussian beam is directed to the wavefront sensor by the PBS 354. Similarly, the plane of SLM-3 350 is imaged onto the plane of the Shack-Hartmann wavefront sensor 367 (WFS, HASO from Imagine Optic Inc.), which enables the WFS to detect the residual wavefront distortion of the Gaussian probe beam. A feedback controller 365 is used to communicate between SLM-3 350 and WFS 367, and provide the correction pattern as a control signal. Once the loop converges and the ultimate correction pattern is obtained for this turbulence realization, HWP-2 360 is then rotated by 90 degrees to align the polarization of OAM beams with the polarization orientation of SLM-3 350. By doing so, the higher-order OAM beams rather than the Gaussian beam will be phase corrected by SLM-3 350.

After the AO system 370, a CCD camera 352 captures the far-field intensity profile of the corrected beam, followed by an SLM-based demultiplexer for BER measurement. In order to reduce the effect of turbulence-induced tilt/tip on OAM demultiplexing, the beam exiting from SLM-3 350 is imaged onto SLM-4 356. By loading an inverse spiral phase hologram of the OAM channel to be detected onto SLM-4 356, the OAM beam is subsequently converted into a Gaussian beam. This Gaussian beam is then coupled into a single mode fiber and sent for coherent detection and off-line signal processing by a coherent receiver 380.

Figure 4:
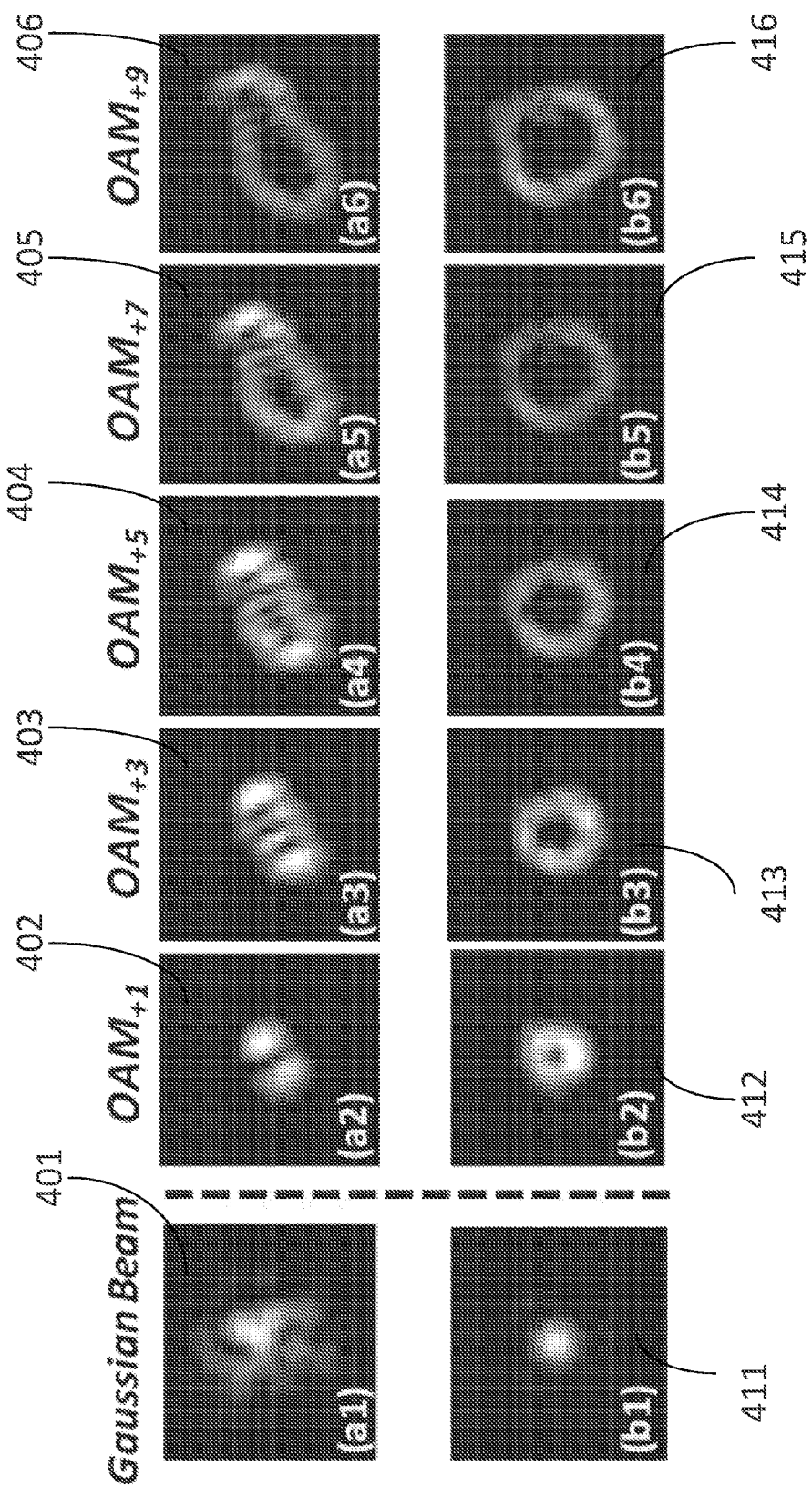
FIG. 4 shows the far field intensity images of the probe Gaussian beam and OAM beams (l=1, 3, 5, 7, 9) before and after compensation.

FIG. 4 shows the far field intensity images of the probe Gaussian beam (l=0) and OAM beams (l=1, 3, 5, 7, 9) before (401, 402, 403, 404, 405, 406) and after (411, 412, 413, 414, 415, 416) compensation. The RMS (root mean square), PV (peak-to-valley) and Strehl ratio of wavefront (in accordance with L. Andrews et. al, SPIE Press (2005)) for the Gaussian beam before (after) compensation are 0.613, 2.562 and 0.23 (0.092, 0.649 and 0.924) respectively. FIG. 4 shows the intensity profile of the probe Gaussian beam and OAM beams before and after compensation respectively. From the far-field images, one can see that the distorted OAM beams (402-406), up to OAM l=9, are efficiently compensated by using the correction pattern derived from the Gaussian beam in AO system.

Figure 5A:
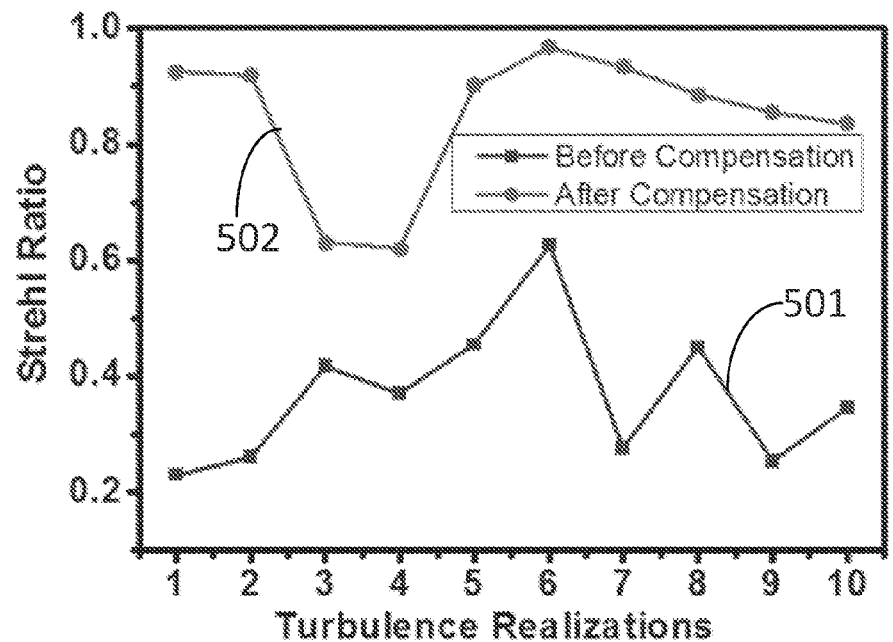
FIG. 5A shows the Strehl ratio for the Gaussian probe beam.
Figure 5B:
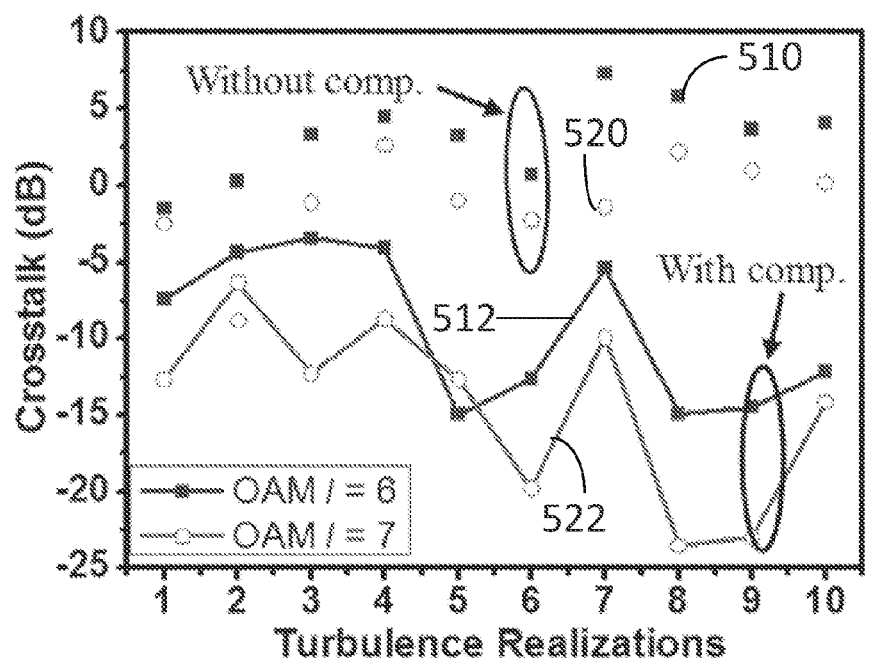
FIG. 5B shows the crosstalk of OAM l=5 on neighbouring modes under different turbulence realizations.

To further examine the compensation efficiency, FIG. 5A shows the Strehl ratio of the Gaussian probe beam and the crosstalk of OAM beams with compensation 502 and without compensation 501 under various turbulence conditions are shown. It is observed that the average Strehl ratio over 10 turbulence realizations of the Gaussian probe beam is improved from 0.368 to 0.847 after compensation. By using the correction pattern obtained from the Gaussian probe beam, the crosstalks of OAM l=5 on adjacent modes l=6, 7 are decreased by about 12.5 dB (see curves 510 and 512) and 13.2 dB (see curves 520 and 522) respectively, as depicted in FIG. 5B. Note that the positive crosstalk is mainly caused by the turbulence-induced tilt/tip.

Figure 5C:
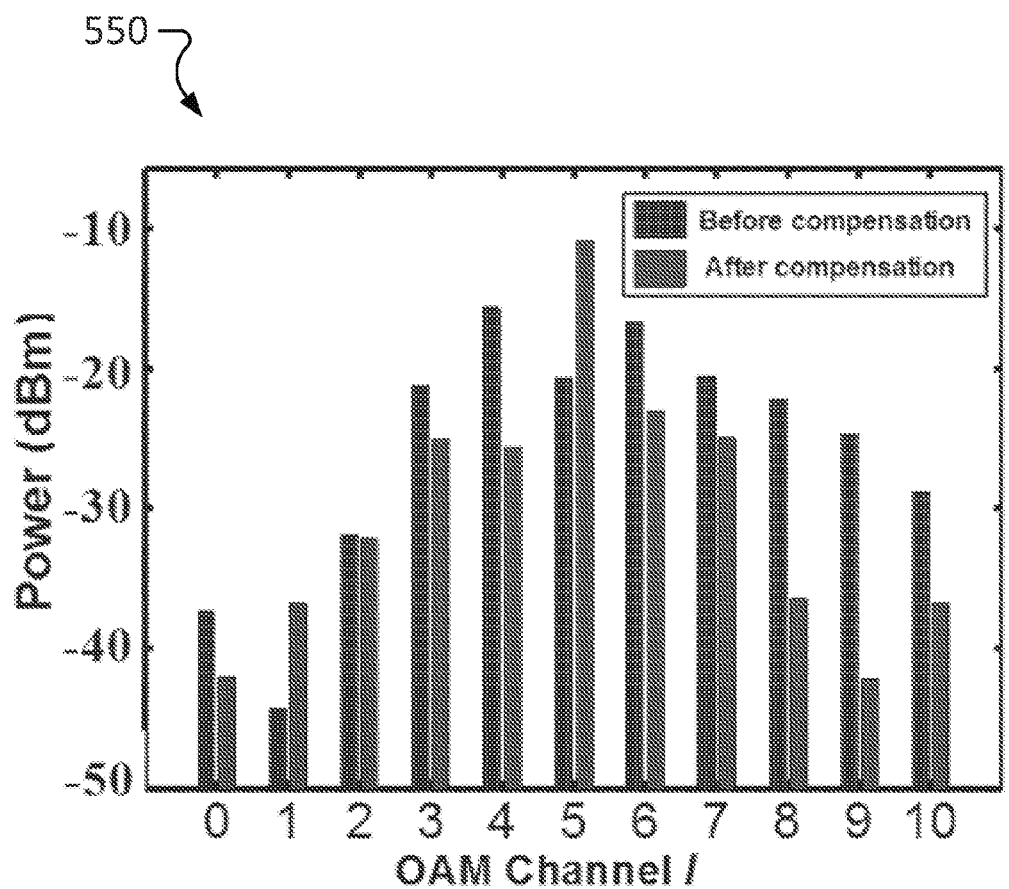
FIG. 5C shows power distribution (coupled into fiber) of OAM modes when transmitting OAM channel l=5 with and without compensation under turbulence realization #10.

FIG. 5C presents the distribution of power 550 coupled into the fiber when transmitting OAM l=5 with and without compensation. One can see that without compensation, the power is nearly equally distributed among OAM l=0 to l=10. While after compensation, the transmitted mode l=5 dominates in the power spectrum.

Figure 6:
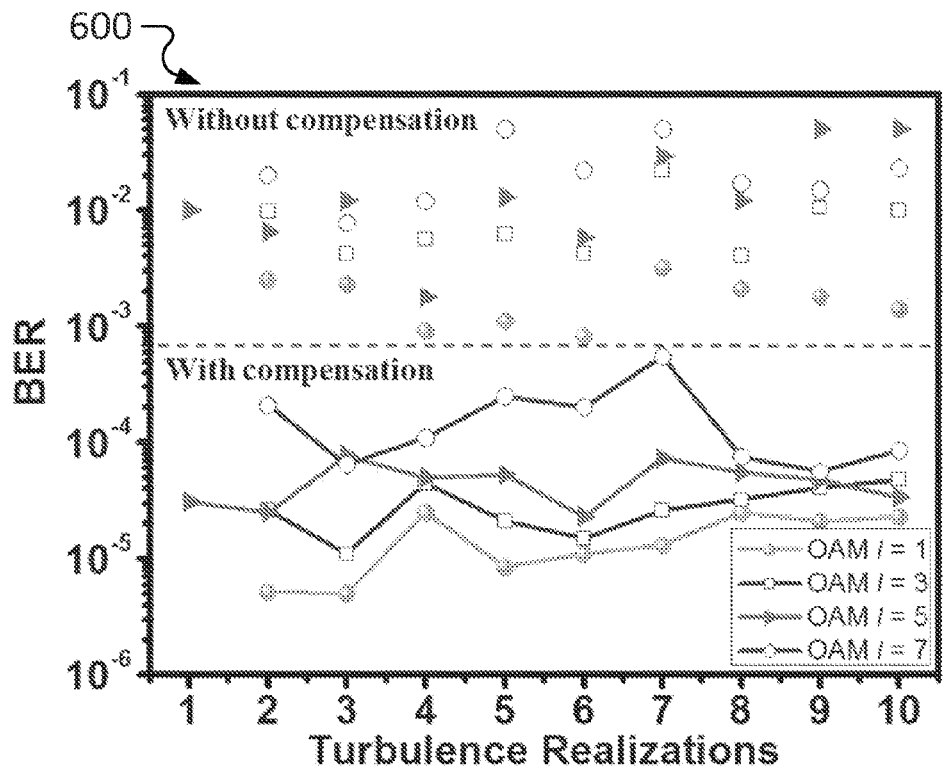
FIG. 6 shows BER (Bit Error Rate) for different OAM channels (l=1, 3, 5, 7) with and without compensation under 10 different turbulence realizations.
Figure 7:
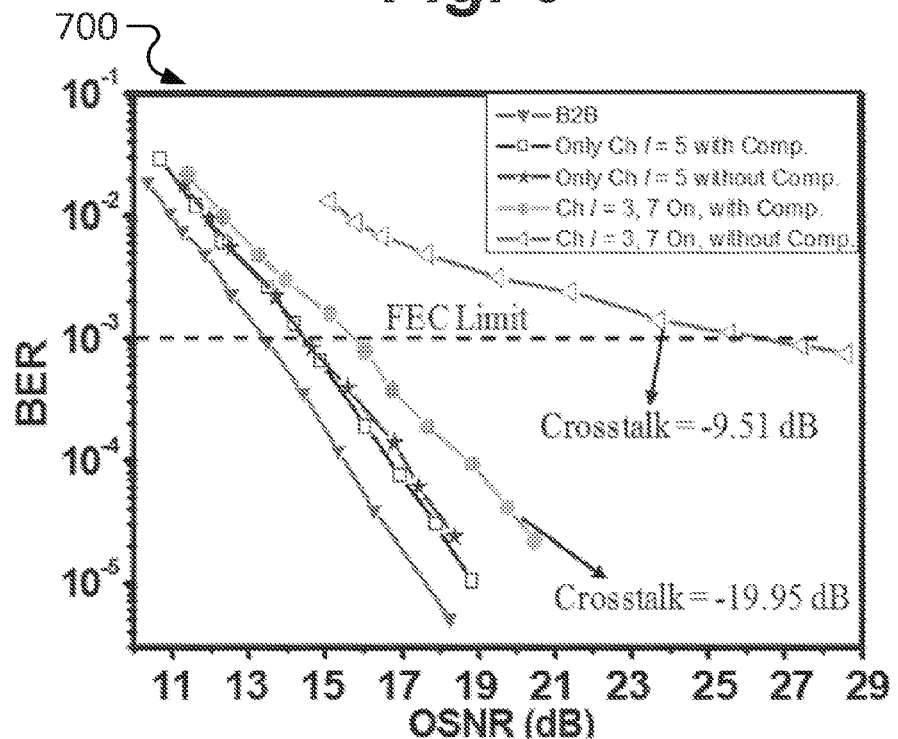
FIG. 7 shows BER for OAM channel l=5 when transmitting three OAM multiplexed channels l=3, 5, 7 with and without compensation under turbulence realization #10.

FIG. 6 shows the BER performance 600 with and without compensation under various turbulence realizations when transmitting different OAM channels (OAM l=1, 3, 5, 7). For fair comparison, the received power of each channel after compensation over 10 different turbulence realization is maintained to be −34 dBm. We see that the BERs for these OAM channels are improved by compensation, with all being below the forward error correction (FEC) limit. The lower-order OAM channels have better BER performance, due to the fact that lower-order OAM beams experience smaller turbulence distortions as their beam sizes increase slower than those of the higher-order OAM beams. FIG. 7 gives the BER performance 700 for OAM channel l=5 with and without compensation under a fixed turbulence condition when transmitting three OAM multiplexed channels l=3, 5, 7. The BER curve without compensation when all OAM channels are on, exhibits the "error floor" phenomenon, due to the severe crosstalk. We can see that the power penalty improves by ~11 dB at BER=1×10$^{-3}$ after compensation.

The distortions of multiple OAM modes after propagating through a turbulent channel have been simultaneously compensated by using a Gaussian probe beam for wavefront sensing. Our results show that the turbulence-induced crosstalk effects on neighboring modes are efficiently mitigated by ~12.5 dB and the system power penalty is improved by ~11 dB after compensation. A new adaptive optics compensation approach for an OAM multiplexed FSO communication system was described, in which a Gaussian beam is used to probe the turbulence-induced wavefront distortions and derive the correction pattern for compensating the OAM beams. Using this approach, we demonstrate simultaneous compensation of multiple OAM beams each carrying a 100-Gbit/s data channel through emulated atmospheric turbulence. The results show that the described approach can efficiently compensate OAM beams with OAM order up to l=9. After compensation, the turbulence-induced crosstalk to neighboring modes of OAM l=5 is reduced by 12.5 dB and the power penalty of OAM channel l=5 is improved by 11 dB.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other implementations fall within the scope of the following claims.

What is claimed is:

1. An orbital-angular-momentum (OAM) multiplexing-based free-space optical (FSO) communication system comprising:

a transmitter configured and arranged to (i) multiplex OAM beams carrying independent data and (ii) transmit the OAM beams along with a Gaussian beam;

a receiver configured and arranged to (i) collect the OAM beams and the Gaussian beam having propagated collinearly, (ii) demultiplex the OAM beams, and (iii) detect the demultiplexed beams and recover the independent data;

wherein the receiver comprises an adaptive optics compensator designed to use the Gaussian beam to probe turbulence distortions and derive data to compensate for turbulence effects on the OAM beams.

2. The system of claim 1, wherein the adaptive optics compensator is designed to obtain correction patterns using the Gaussian beam as a probe for wavefront distortion measurements, and use the correction patterns to simultaneously compensate for turbulence effects on multiple OAM beams.

3. The system of claim 1, wherein the adaptive optics compensator comprises:
a beam separator to separate the Gaussian beam from the OAM beams;
a first wavefront corrector to process the separated OAM beams and output corrected OAM beams;
a second wavefront corrector to process the separated Gaussian beam and generate a corrected Gaussian beam;
a wavefront sensor to process the corrected Gaussian beam; and
a feedback controller coupled with the wavefront sensor to provide feedback to the first wavefront corrector and the second wavefront corrector.

4. The system of claim 1, wherein the adaptive optics compensator comprises:
a beam separator to separate the Gaussian beam from the OAM beams;
a Shack-Hartmann wavefront sensor to measure wavefront distortions of the Gaussian beam;
a feedback controller coupled with the Shack-Hartmann wavefront sensor to provide the correction patterns to two wavefront correctors; and
the two wavefront correctors being loaded with the same correction patterns used to correct the OAM beams and the Gaussian beam, respectively.

5. The system of claim 1, wherein the OAM beams encode the independent data using an on-off keying modulation format.

6. The system of claim 1, wherein the OAM beams encode the independent data using a phase-shift keying modulation format.

7. The system of claim 1, wherein the OAM beams encode the independent data using a quadrature amplitude modulation format.

8. The system of claim 1, wherein the OAM beams encode the independent data as 100-Gbit/s quadrature phase-shift keying (QPSK) signals.

9. The system of claim 4, wherein the beam separator comprises a polarization beamsplitter.

10. The system of claim 4, wherein the beam separator comprises a wavelength filter.

11. An orbital-angular-momentum (OAM) multiplexing-based free-space optical (FSO) communication receiver comprising:
an input to receive an optical communication beam comprising (i) multiplexed OAM beams carrying independent data and (ii) a Gaussian probe beam; and
an adaptive optics compensation system coupled with the input, the adaptive optics compensation system comprising (i) a beam separator to separate the Gaussian probe beam from the OAM beams, (ii) a first wavefront corrector to process the separated OAM beams and output corrected OAM beams based on correction patterns generated for the Gaussian probe beam, and (iii) a second wavefront corrector to process the separated Gaussian probe beam and generate a corrected Gaussian beam based on the correction patterns generated for the Gaussian probe beam.

12. The receiver of claim 11, wherein the adaptive optics compensation system comprises:
a wavefront sensor to process the corrected Gaussian beam; and
a feedback controller coupled with the wavefront sensor to provide feedback to the first wavefront corrector and the second wavefront corrector.

13. The receiver of claim 11, wherein the beam separator comprises a polarization beamsplitter.

14. The receiver of claim 11, wherein the beam separator comprises a wavelength filter.

15. The receiver of claim 12, wherein the wavefront sensor comprises a Shack-Hartmann wavefront sensor to measure wavefront distortions of the Gaussian probe beam.

16. A method comprising:
receiving an optical signal comprising orbital-angular-momentum (OAM) beams and a Gaussian beam, wherein each of the OAM beams carries an independent data stream;
separating the Gaussian beam from the OAM beams;
obtaining correction patterns using the Gaussian beam for wavefront distortion measurements; and
simultaneously compensating for effects of atmospheric turbulence on the OAM beams and the Gaussian beam using the correction patterns.

17. The method of claim 16, wherein the separating comprises using a polarization beamsplitter to separate the Gaussian beam from the OAM beams, which are on different polarizations.

18. The method of claim 16, wherein the separating comprises using a wavelength filter to separate the Gaussian beam from the OAM beams, which are on different wavelengths.

19. The method of claim 16, wherein the obtaining comprises using a Shack-Hartmann wavefront sensor to measure wavefront distortions of the Gaussian beam.

20. The method of claim 16, wherein the compensating comprises loading two wavefront correctors with the same correction patterns provided by a feedback controller coupled with a Shack-Hartmann wavefront sensor.

* * * * *